US007856109B2

(12) United States Patent
Lin et al.

(10) Patent No.: US 7,856,109 B2
(45) Date of Patent: Dec. 21, 2010

(54) AUDIO SIGNAL SWITCHING APPARATUS

(75) Inventors: Wei-Po Lin, Taipei (TW); Hsin-Tso Lin, Taipei (TW); Hsien-Yueh Hsu, Taipei (TW)

(73) Assignee: Asustek Computer Inc., Peitou, Taipei (TW)

( * ) Notice: Subject to any disclaimer, the term of this patent is extended or adjusted under 35 U.S.C. 154(b) by 1353 days.

(21) Appl. No.: 11/341,102

(22) Filed: Jan. 27, 2006

(65) Prior Publication Data

US 2006/0171545 A1 Aug. 3, 2006

(51) Int. Cl.
*H02B 1/00* (2006.01)
*G06F 17/00* (2006.01)
(52) U.S. Cl. .......................................... 381/123; 700/94
(58) Field of Classification Search .................... 700/94; 381/306, 309, 26, 58, 59, 77, 81, 84, 85, 381/333, 123, 388
See application file for complete search history.

(56) References Cited

U.S. PATENT DOCUMENTS

| 5,768,601 | A | * | 6/1998 | Tran ............................ 381/120 |
| 6,675,233 | B1 | * | 1/2004 | Du et al. ........................ 710/14 |
| 2002/0052990 | A1 | * | 5/2002 | Chan et al. .................... 710/73 |
| 2004/0249489 | A1 | * | 12/2004 | Dick ............................ 700/94 |

FOREIGN PATENT DOCUMENTS

| CN | 2367042 | 3/2000 |
| CN | 2572463 | 9/2003 |

OTHER PUBLICATIONS

English language translation of abstract of CN 2572463.
English language translation of abstract of CN 2367042.

* cited by examiner

*Primary Examiner*—Ping Lee
(74) *Attorney, Agent, or Firm*—Thomas, Kayden, Horstemeyer & Risley, LLP

(57) ABSTRACT

An audio signal switching apparatus at least comprises an audio jack, a speaker jack, a detection circuit and a control circuit. The audio jack and the speaker jack are separately configured in a computer system. The detection circuit detects whether the computer system is turned on or turned off. The control circuit is connected to the detection circuit and electrically connects the audio jack to the speaker jack when the computer system is turned off.

20 Claims, 5 Drawing Sheets

AUDIO SIGNAL SWITCHING APPARATUS

RELATED APPLICATIONS

The present application is based on, and claims priority from, Taiwan Application Serial Number 94103426, filed Feb. 3, 2005, the disclosure of which is hereby incorporated by reference herein in its entirety.

BACKGROUND

1. Field of Invention

The present invention relates to an audio signal switching apparatus. More particularly, the present invention relates to a circuit for switching an audio output path of a computer system.

2. Description of Related Art

With the rapid development of information technology, computers and peripherals have become very popular. A modern design is to configure I/O ports which users often use onto a front panel of a computer case, such that users may conveniently and freely plug in their peripherals, such as earphones or USB drives. In this modern case design, an audio output of the computer system (e.g. an audio codec) is generally confined to output audio signals only to an audio jack on the front panel or a speaker jack on the rear panel of the computer system. That is, the user can only select to use either an earphone or a speaker to play the music media stored in the computer system. When the user is listening to the audio signals through the audio jack of the front panel (e.g. by plugging in the earphone), the speaker plugged into the speaker jack of the rear panel does not receive the audio signals.

Moreover, digital audio playing devices are widely used recently, and portable digital audio players, such as CD walkmans or MP3 walkmans, are especially popular with the general public. If used to play digital audio media, the computer system must be turned on to decode and output the digital audio media. Some computer manufacturers provide a computer architecture called "barebone", which is similar to a household appliance. The barebone can play the digital audio media while the computer is turned off, thus enabling users to listen to music by the barebone without turning the computer system on, i.e. without loading the operating system of the computer.

However, the barebone has many disadvantages. The barebone is expensive because the customer has to pay at least 50 USD for an operation interface and a simple digital audio playing system (e.g. a system chip, NAND Flash and DRAM) on the computer. Moreover, the simple digital audio playing system cannot offer various sound effects and enhancements or a full management of songs. The operation interface of the simple digital audio playing system is generally different from that of the walkman which the user is accustomed to, so the user may confuse using the two different operation interfaces. In addition, some special digital audio media for walkmans (like ipod) have specific access protections, making them hard to play directly by the barebone.

SUMMARY

The present invention provides an audio signal switching apparatus, which enables users to directly connect a digital audio playing device and a speaker through a computer system, so as to decrease the cost and obtain a good audio signal processing ability.

According to the present invention, the audio signal switching apparatus at least comprises an audio jack, a speaker jack, a detection circuit and a control circuit. The audio jack and the speaker jack are separately configured in a computer system. The detection circuit detects whether the computer system is turned on or turned off. The control circuit is electrically connected to the detection circuit and connects the audio jack and the speaker jack when the computer system is turned off.

It is another aspect of the present invention to provide an audio signal switching apparatus, which can automatically or manually switch an audio output path of a computer system, in order to increase the computer system value and enhance the operating convenience of users.

According to the present invention, the audio signal switching apparatus at least comprises a case and a control circuit. The case at least comprises a computer system and has an audio jack and a speaker jack. The control circuit is electrically connected to the audio jack, the speaker jack and the computer system. When the computer system is turned off, the control circuit is arranged to electrically connect the audio jack to the speaker jack.

It is still another aspect of the present invention to provide a computer system, which connects its original audio jack and speaker jack when turned off, such that users can directly plug in an audio playing device to play audio media.

According to the present invention, the computer system has an audio jack and a speaker jack, and can selectively output audio signals through the audio jack or the speaker jack when turned on. The computer system is characterized by comprising an audio signal switching apparatus, which electrically connects the audio jack to the speaker jack when the computer system is turned off.

It is to be understood that both the foregoing general description and the following detailed description are examples, and are intended to provide further explanation of the invention as claimed.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

Figure 1A:
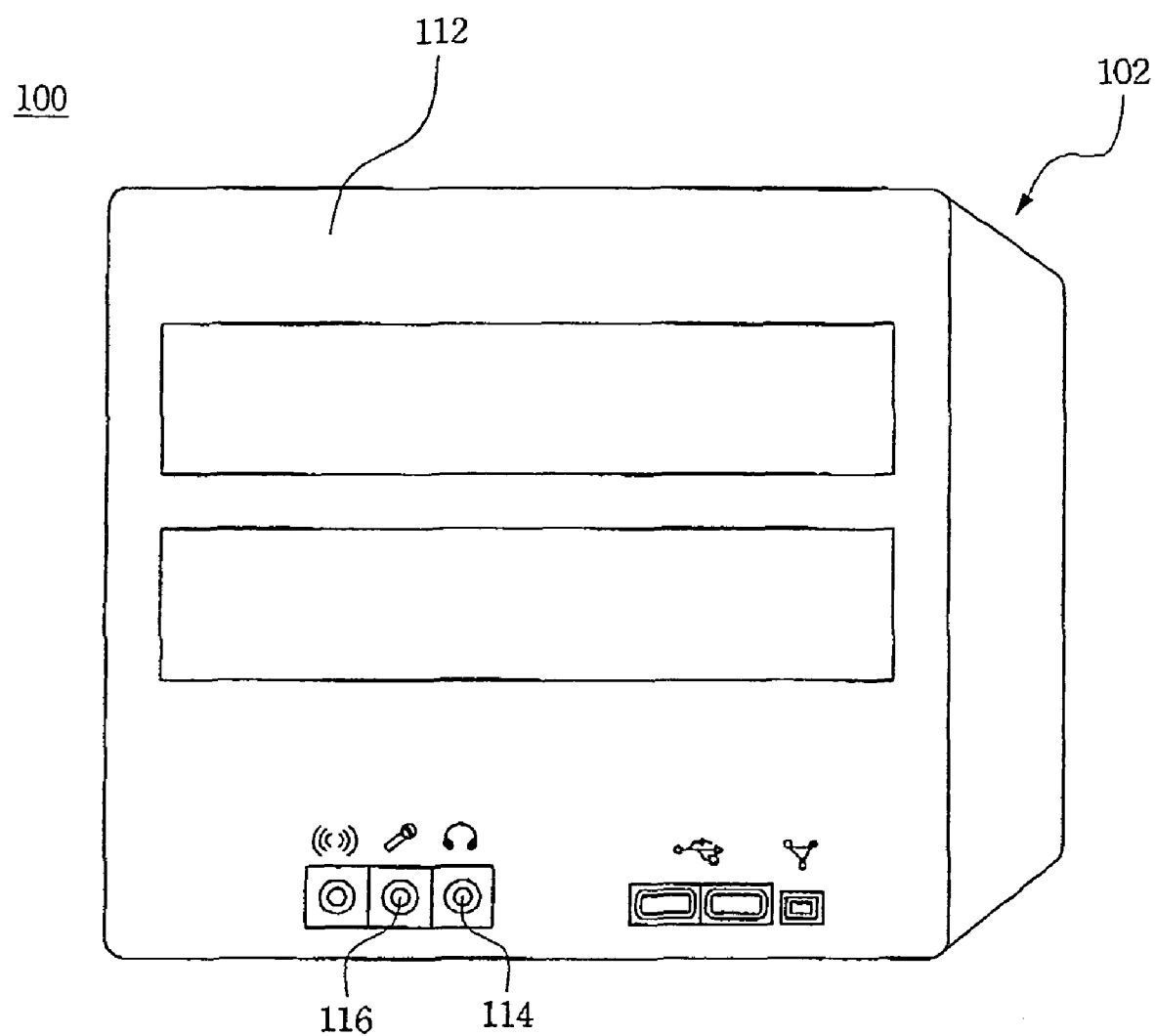
FIG. 1A is a front view of one preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention electrically connects an audio jack to a speaker jack when a computer system is turned off, and thus a user can play the audio media of an external audio playing device directly by a speaker coupled to the computer system. Therefore, the user can operate the same operation interface that he is used to whether he is listening to the audio media by an earphone coupled to a walkman or by the speaker coupled to the computer system.

Figure 1B:
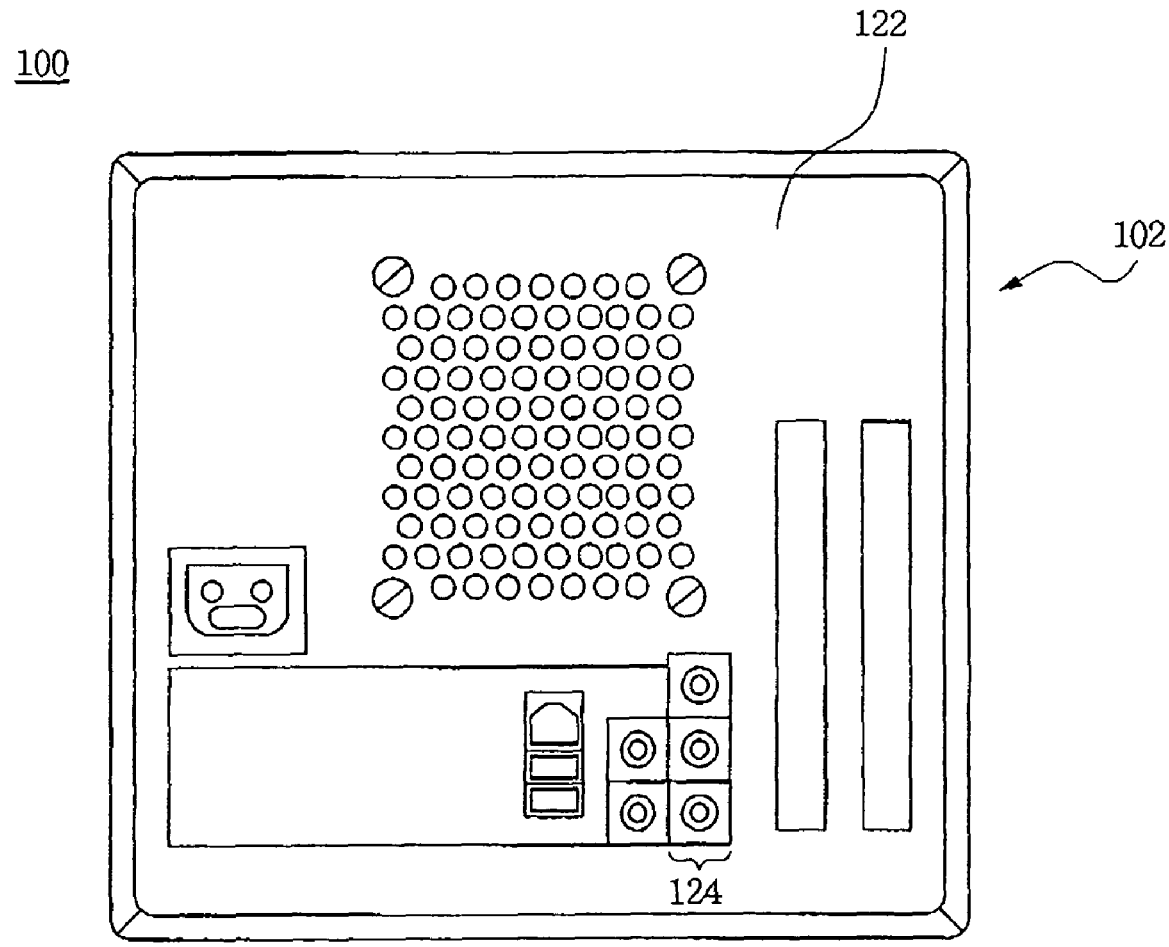
FIG. 1B is a rear view of the preferred embodiment.

FIG. 1A is a front view of one preferred embodiment of the present invention, and FIG. 1B is a rear view of the preferred embodiment, illustrating configurations of an audio jack and a speaker jack in a computer system. In the preferred embodiment, a computer system 100 is a host computer system or a barebone computer system. A case 102 of the computer system 100 has a front panel 112 and a rear panel 122. The audio jacks which users often use, such as an earphone output jack 114 or a microphone output jack 116, are configured on the front panel 112 for users to plug in their peripherals, such as an earphone or a microphone. The speaker jack 124 used to connect a speaker is generally configured on the rear panel 122 for users to easily arrange and hide the connecting cables of the speaker behind the computer system 100.

Figure 2:
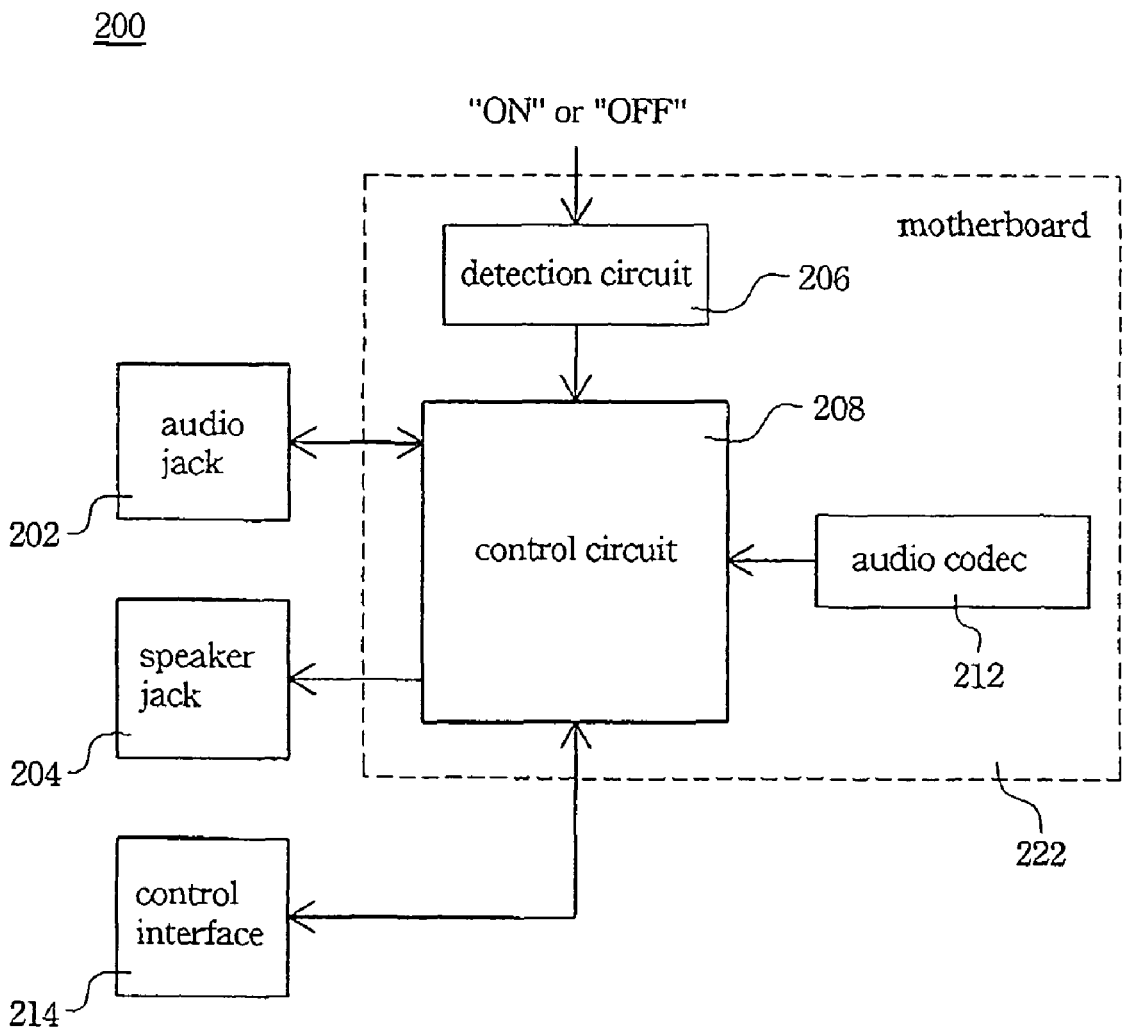
FIG. 2 is a circuit functional block diagram of one preferred embodiment of the present invention.

FIG. 2 is a circuit functional block diagram of one preferred embodiment of the present invention. An audio signal switching apparatus 200 is used in the computer system 100 as illustrated in FIG. 1A and FIG. 1B and at least comprises an audio jack 202, a speaker jack 204, a detection circuit 206 and a control circuit 208. The audio jack 202 and the speaker jack 204 are separately configured in the computer system 100. The detection circuit 206 detects whether the computer system 100 is turned on ("ON") or turned off ("OFF"). The control circuit 208 is electrically connected to the detection circuit 206 and connects the audio jack 202 and the speaker jack 204 when the computer system 100 is turned off.

When the computer system 100 is turned on, the control circuit 208 is arranged to selectively connect one of the audio jack 202 or the speaker jack 204 to an audio codec 212 of the computer system 100. In other words, at that time, the user can only select either the audio jack 202 or the speaker jack 204 to play the music media from the computer system 100. When the user is listening to the audio signals of the computer system 100 by the audio jack 202 (e.g. with the earphone or another speaker), the speaker connected to the speaker jack 204 does not receive the same audio signals. Conversely, when the user is listening to the audio signals of the computer system 100 by the speaker jack 204, the peripherals connected to the audio jack 202 do not receive the same audio signals.

In the preferred embodiment, the detection circuit 206 and the control circuit 208 are integrated into a motherboard 222 of the computer system 100. The audio codec 212 can be a built-in audio chip of the motherboard 222 or an external audio card plugged into the motherboard 222. The detection circuit 206 determines whether the computer system 100 is turned on or turned off according to an electrical signal of the motherboard 222, such as a +5V signal or other power-up or power-down signals or flags. The audio jack 202 can be the earphone output jack 114 or the microphone input jack 116, which is for example configured on the front panel 112 of the case 102 of the computer system 100, enabling input of audio media from another audio playing device, such as a CD walkman or an MP3 walkman. The speaker jack 204 is, for example, configured on the rear panel 122 of the case 102 of the computer system 100, for connecting a speaker, an amplifier or other audio output apparatus.

In addition, the audio signal switching apparatus 200 further comprises an operation interface 214, such as a liquid crystal panel and a set of buttons electrically connected to the control circuit 208. By this operation interface 214, user can manually switch the audio jack 202 to be electrically connected to the speaker jack 204 or the audio codec 212.

Figure 3:
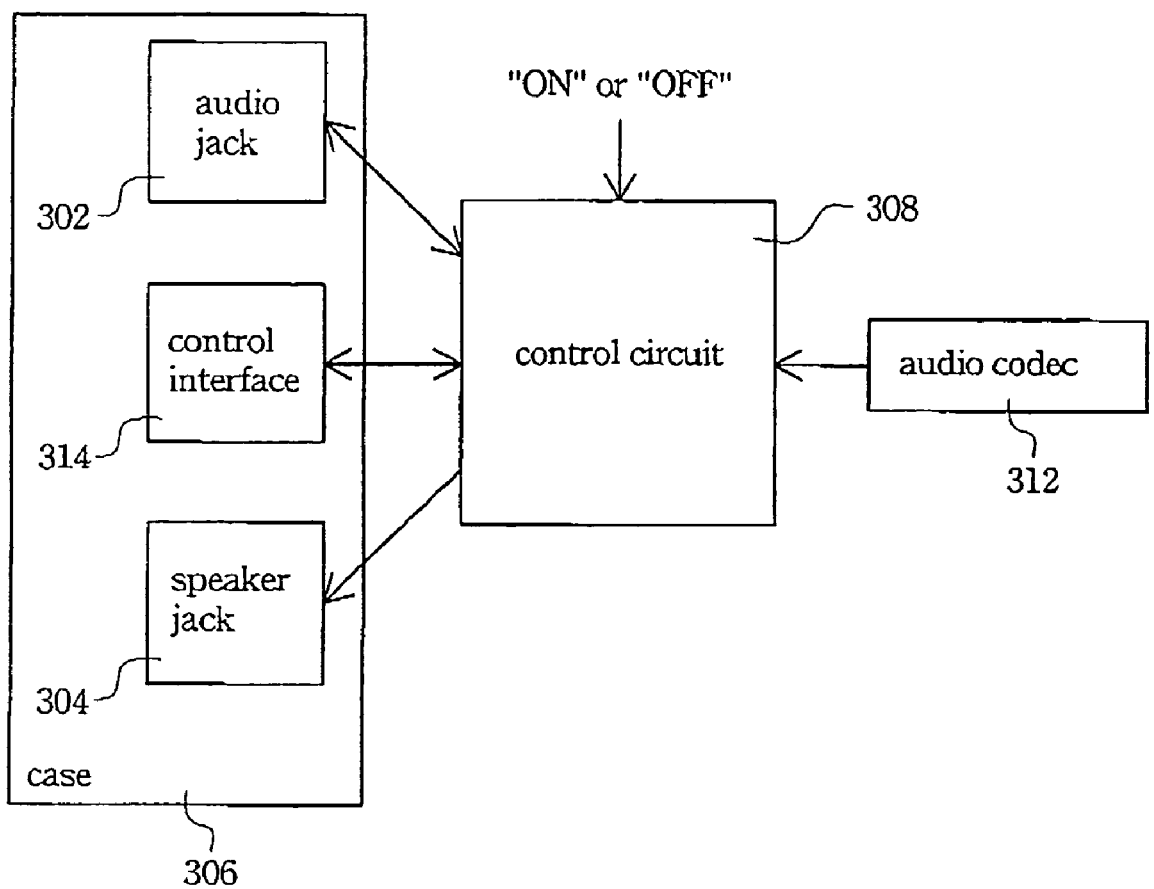
FIG. 3 is a circuit functional block diagram of another preferred embodiment of the present invention.

FIG. 3 is a circuit functional block diagram of another preferred embodiment of the present invention. An audio signal switching apparatus 300 at least comprises a case 306 and a control circuit 308. The case 306 physically encloses a motherboard (not illustrated) and comprises an audio jack 302 and a speaker jack 304. The control circuit 308 is electrically connected to the audio jack 302, the speaker jack 304 and the motherboard. The control circuit 308 can be configured on the motherboard, and when the motherboard is turned off ("OFF"), the control circuit 308 electrically connects the audio jack 302 to the speaker jack 304. Moreover, when the motherboard is turned on ("ON"), the control circuit 308 is arranged to selectively connect one of the audio jack 302 or the speaker jack 304 to an audio codec 312.

In the preferred embodiment, the control circuit 308 has both functions of detecting whether the computer is turned on or turned off and switching the audio output path. The control circuit 308 determines whether the motherboard is turned on or turned off according to an electrical signal of the motherboard, such as a +5V signal or other power-up or power-down signals or flags. The audio jack 302 can be an earphone output jack or a microphone input jack, which is for example configured on the front panel of the case 306, enabling input of audio media from another audio playing device, such as a CD walkman or an MP3 walkman. The speaker jack 304 is for example configured on the rear panel of the case 306, for connecting a speaker, an amplifier or other audio output apparatus. The audio codec 312 can be a built-in audio chip of the motherboard or an external audio card plugged into the motherboard.

In addition, the audio signal switching apparatus 300 further comprises an operation interface 314, such as a liquid crystal panel and a set of buttons, electrically connected to the control circuit 308. By this operation interface 314, user can manually switch the audio jack 302 to be electrically connected to the speaker jack 304 or to the audio codec 312.

Figure 4:
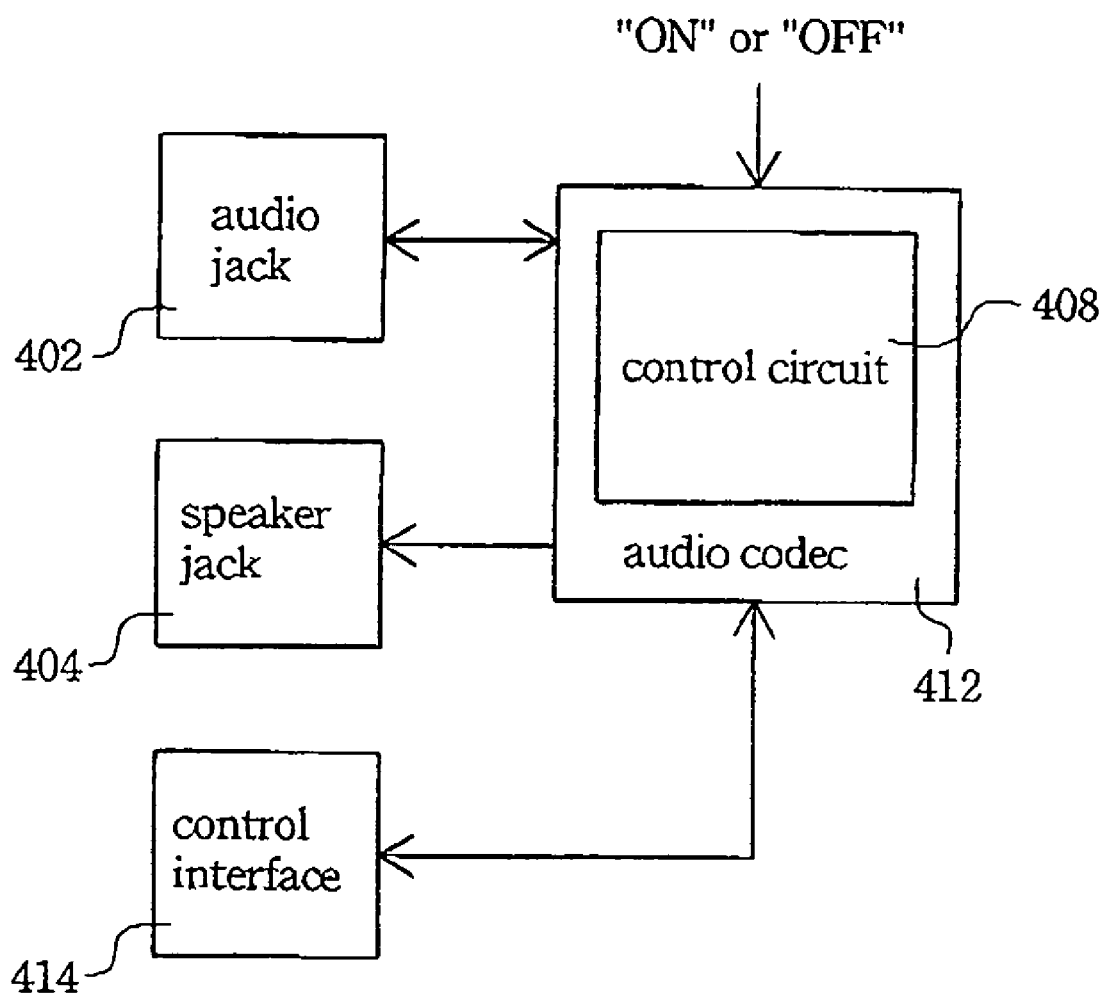
FIG. 4 is a circuit functional block diagram of another preferred embodiment of the present invention.

FIG. 4 is a circuit functional block diagram of another preferred embodiment of the present invention. An audio signal switching apparatus 400 has an audio jack 402, a speaker jack 404 and a control circuit 408. The control circuit 408 is electrically connected to the audio jack 402 and the speaker jack 404. When a computer system (e.g. containing a motherboard) is turned off ("OFF"), the control circuit 408 electrically connects the audio jack 402 to the speaker jack 404. When the computer system is turned on ("ON"), the control circuit 408 is arranged to selectively connect one of the audio jack 402 and the speaker jack 404 to an audio codec 412.

In the preferred embodiment, the control circuit 408 has both functions of detecting whether the computer is turned on or turned off and switching the audio output path. The control circuit 408 is integrated into the audio codec 412. The audio codec 412 can be a built-in audio chip of the motherboard or an external audio card plugged into the motherboard. Persons skilled in the art can understand that the control circuit for switching the audio output path and the detection circuit for detecting whether the computer is turned on or turned off are two independent circuits with different functions; two different functions also can be integrated into the audio codec 412, thus decreasing the cost and the occupied space.

Moreover, the control circuit 408 determines whether the computer system is turned on or turned off according to an electrical signal of the computer system, such as a +5V signal of the motherboard or other power-up or power-down signals or flags. The audio jack 402 can be an earphone output jack or a microphone input jack, which is for example configured on the front panel of the case of the computer system, enabling input of audio media from another audio playing device, such as a CD walkman or an MP3 walkman. The speaker jack 404 is, for example configured on the rear panel of the case of the computer system, for connecting a speaker, an amplifier or other audio output apparatus.

In addition, the audio signal switching apparatus 400 further comprises an operation interface 414, such as a liquid crystal panel and a set of buttons, electrically connected to the control circuit 408. By this operation interface 414, user can manually switch the audio jack 402 to be electrically connected to the speaker jack 404 or to the audio codec 412.

The audio signal switching apparatus of these foregoing embodiments can allow a user to directly connect his audio signal playing device through the audio jack to the speaker which is connected to the speaker jack of the computer system and to output the audio media of the audio signal playing device to the speaker. Listening to audio media in this manner without turning on the computer can prevent wasting power and noise interference by the computer fans. The simple digital audio playing system of the computer system, which is very expensive but has low functionality, can be omitted. Additionally, the user only needs to know one operation interface well and never has to consider the specific protections of accessing or converting audio media among different system platforms.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for switching an audio output path of a computer system, the apparatus comprising:
    an audio jack configured in the computer system;
    a speaker jack configured in the computer system;
    a detection circuit arranged to detect whether the computer system is turned on or turned off; and
    a control circuit electrically connected to the detection circuit, and arranged to electrically connect the audio jack to the speaker jack when the computer system is turned off, wherein the audio jack is an earphone output jack configured on a front panel of the computer system.

2. The apparatus of claim 1, wherein when the computer system is turned on, the control circuit is arranged to selectively connect one of the audio jack or the speaker jack to an audio codec of the computer system.

3. The apparatus of claim 1, wherein the speaker jack is configured on a rear panel of the computer system.

4. The apparatus of claim 1, wherein the detection circuit and the control circuit are integrated into the audio codec of the computer system.

5. The apparatus of claim 1, further comprising:
    an operation interface electrically connected to the control circuit;
    wherein the audio jack is switched to electrically connect to the speaker jack or to an audio codec of the computer system manually by using the operation interface.

6. An audio signal switching apparatus, comprising:
    a case enclosing a computer system, wherein the case has an audio jack and a speaker jack; and
    a control circuit electrically connected to the audio jack, the speaker jack and the computer system, wherein when the computer system is turned off, the control circuit is arranged to electrically connect the audio jack to the speaker jack, wherein the audio jack is an earphone output jack configured on a front panel of the case.

7. The audio signal switching apparatus of claim 6, wherein when the computer system is turned on, the control circuit is arranged to selectively connect one of the audio jack or the speaker jack to an audio codec of the computer system.

8. The audio signal switching apparatus of claim 6, wherein the speaker jack is configured on a rear panel of the case.

9. The audio signal switching apparatus of claim 6, wherein the detection circuit and the control circuit are integrated into an audio codec of the computer system.

10. The audio signal switching apparatus of claim 6, further comprising:
    an operation interface configured on a front panel of the case and electrically connected to the control circuit, wherein the audio jack is switched to electrically connect to the speaker jack or an audio codec of the computer system manually by using the operation interface.

11. An apparatus for switching an audio output path of a computer system, the apparatus comprising:
    an audio jack configured in the computer system;
    a speaker jack configured in the computer system;
    a detection circuit arranged to detect whether the computer system is turned on or turned off; and
    a control circuit electrically connected to the detection circuit, and arranged to electrically connect the audio jack to the speaker jack when the computer system is turned off, wherein the audio jack is a microphone input jack configured on a front panel of the computer system.

12. The apparatus of claim 11, wherein when the computer system is turned on, the control circuit is arranged to selectively connect one of the audio jack or the speaker jack to an audio codec of the computer system.

13. The apparatus of claim 11, wherein the speaker jack is configured on a rear panel of the computer system.

14. The apparatus of claim 11, wherein the detection circuit and the control circuit are integrated into the audio codec of the computer system.

15. The apparatus of claim 11, further comprising:
    an operation interface electrically connected to the control circuit;
    wherein the audio jack is switched to electrically connect to the speaker jack or to an audio codec of the computer system manually by using the operation interface.

16. An audio signal switching apparatus, comprising:
    a case enclosing a computer system, wherein the case has an audio jack and a speaker jack; and
    a control circuit electrically connected to the audio jack, the speaker jack and the computer system, wherein when the computer system is turned off, the control circuit is arranged to electrically connect the audio jack to the speaker jack, wherein the audio jack is a microphone input jack configured on a front panel of the case.

17. The audio signal switching apparatus of claim 16, wherein when the computer system is turned on, the control circuit is arranged to selectively connect one of the audio jack or the speaker jack to an audio codec of the computer system.

18. The audio signal switching apparatus of claim 16, wherein the speaker jack is configured on a rear panel of the case.

19. The audio signal switching apparatus of claim 16, wherein the detection circuit and the control circuit are integrated into an audio codec of the computer system.

20. The audio signal switching apparatus of claim 16, further comprising:
    an operation interface configured on a front panel of the case and electrically connected to the control circuit, wherein the audio jack is switched to electrically connect to the speaker jack or an audio codec of the computer system manually by using the operation interface.

* * * * *